3,542,644
WET STRENGTH PAPER COMPRISING STARCH CARBAMOYLETHYL ETHERS
Herbert E. Smith, Sherald H. Gordon, and Herbert C. Katz, Peoria, Ill., assignors to the United States of America as represented by the Secretary of Agriculture
No Drawing. Filed Aug. 9, 1968, Ser. No. 751,341
Int. Cl. D21h 3/28
U.S. Cl. 162—175                                                                 1 Claim

ABSTRACT OF THE DISCLOSURE

Papers prepared from pulps containing 5 percent additions of carbamoylethyl ethers of starch or wheat flour that have then been crosslinked with sodium hypochlorite exhibit greatly increased wet tensile strength accompanied by less spectacular but significantly improved dry tensile and burst values.

---

A nonexclusive, irrevocable, royalty-free license in the invention herein described, throughout the world for all purposes of the United States Government, with the power to grant sublicenses for such purposes is hereby granted to the Government of the United States of America.

BACKGROUND OF THE INVENTION

This invention relates to the discovery that a wet-end incorporation in a papermaker's cellulosic pulp of a hypochlorite-crosslinked starch carbamoylethyl ether having a carbamoylethyl D.S. of 0.25–0.43 increases the wet strength of the paper by a factor of about 10–14 while less conspicuously but appreciably also increasing the dry strength properties thereof.

The consumer benefits of improving the wet strength of such paper products as towels, toilet tissue, grocery bags, etc., during the relatively few years since the patenting by this laboratory of wet strength paper containing dialdehyde starch has lead to widespread industrial research and development in this field.

A diversity of wet strength resins and cationic starches that improve the wet strength of paper are now known, but many of these products share the still excessive cost limitation of dialdehyde starch. Furthermore, the resins that provide the largest increases in wet strength generally fail to also improve the dry strength properties of the paper, or they even embrittle the paper and thereby actually decrease the dry strength values of the paper.

The object of the instant invention is the provision of a process whereby the incorporation of a critically precrosslinked novel starch derivative in papermaker's cellulosic pulps provides low cost papers that exhibit greatly increased wet strength properties as well as lesser but significantly increased dry strength values.

In accordance with the broad object of the invention we have now discovered that wet-end incorporations at a level of about 5 percent of an ex situ, i.e., precrosslinked starch carbamoylethyl ether having a carbamoylethyl D.S. of 0.25–0.43 or of a similarly derivatized and crosslinked wheat flour provides unpredictably great increases, e.g., well exceeding 1000 percent, in the wet strength of heat-cured paper made from the thusly fortified unbleached or bleached kraft fiber pulps while also materially increasing the dry strength values thereof.

The uncrosslinked carbamoylethyl ethers of starch per se are well known. As taught in Cushing's U.S. Pat. No. 3,135,738, the ungelatinized starch ethers are produced by reacting starch and acrylamide at from room temperature to 46° C. in the presence of sodium hydroxide and saturated sodium sulfate, and the so-formed uncrosslinked starch ethers having a carbamoyl ether D.S. ranging from 0.02 to about 0.27 are added to paper pulps at levels of 0.5–1.0 percent as retention aids for pigments. The patent also suggests only retention aid employment for the allegedly crosslinked starch carbamoyl ethers produced by reacting starch with an acrylamide-formaldehyde mixture, or with either N-methylol acrylamide or N,N'-methylene bisacrylamide, any crosslinks whereof would necessarily be exclusively through methylene groups. Even if the methylene crosslinked species of Cushing's starch ethers were capable of markedly increasing the wet strength of paper, which we have conclusively found they are not, the low levels of addition used by Cushing would at most provide only a nominal increase in wet strength that could not possibly have alerted Cushing to the highly unobvious wet-strength improvements of the instant invention wherein applicants have also found that only the starch carbamoylethyl ethers that have been critically crosslinked at about pH 2 with a very limited amount of a chlorine source such as a solution of commercial sodium hypochlorite are operative as wet-strength additives, whereas the same starch ethers wherein crosslinking was attempted with hydrogen peroxide, periodic acid, nitrous acid, bromine water, or with iodine were inoperative for applicants' purpose. Applicants believe this apparent inconsistency may be explainable on the basis that starch ethers containing carbamoylethyl groups react with the available chlorine of the hypochlorite solution to form a minor proportion of the corresponding N-chloro amide groups which groups in turn each react with a hydrogen atom of an unchanged carbamoylethyl group to eliminate a molecule of HCl and forms an imide-type crosslink between two nitrogen atoms.

In accordance with the general object of our invention we have now unexpectedly discovered that paper exhibiting tremendously increased wet strength and modestly increased dry strength is obtained from cellulosic pulps containing 5 percent based on the dry weight of the pulp of a sodium hypochlorite crosslinked carbamoylethyl ether of starch wherein the carbamoylethyl D.S. is 0.25–0.43.

The following illustrative embodiment and tables will enable those skilled in the art to directly practice our invention in the most effective manner. All quantities are in parts by weight unless otherwise noted.

EXAMPLE 1

An ungelatinized starch carbamoylethyl ether containing 3.12 g. nitrogen and having a carbamoyl ether D.S. of 0.433 was prepared by slurrying 162 g. (dry basis) of pearl corn starch in 234 ml. of saturated sodium sulfate solution, and then to the slurry adding in turn 60 g. of acrylamide and, by dropwise addition, 17.5 g. of 24 percent NaOH solution. The constantly stirred mixture was reacted at 40–42° C. for 18 hours, diluted to a volume of ca. 1200 ml. with distilled water, the pH adjusted to 6.8 with 1 N HCl, and the crude starch either was isolated by filtration. A portion of the crude material was purified by washing several times with water, partially dehydrated with absolute ethanol, vacuum dried over $H_2SO_4$, and ground to a 40 mesh powder, the last two steps also being applied to the "unpurified" portion.

A 1 percent starch ether paste or dispersion was prepared by weighing 5 g. of either of the above powders into a 3-necked flask equipped with a stirrer and a thermometer housed in a mercury well. Following the addition of 495 g. tap water, the stirred suspension was heated on a steam bath for 30 minutes at 90° C. in a closed system, and then was allowed to cool.

To prepare experimental handsheets, 30 g. of wet unbleached kraft pulp containing 7.2 g. of solids (dry basis) was diluted with 293 g. tap water. Then 36.0 g. of the 1 percent starch ether paste (corresponding to a 5 percent level of addition) was weighed into a beaker, the pH was lowered to 2 with 0.5 ml. 6 N $H_2SO_4$, and the starch ether was crosslinked by the addition of 1 ml. of commercial sodium hypochlorite solution containing 5–5.2 percent of available chlorine. The visibly flocculated crosslinked starch ether was then added to the dispersed pulp and thoroughly blended therewith. The resulting pulp furnish, having an oven dry consistency of 2 percent, was divided into 6 equal parts and each part upon transfer to the handsheet mold was diluted with 99 parts of tap water to give a final pulp consistency of 0.02 percent, from which a standard handsheet was formed. The replicate handsheets were oven dried for 15 minutes at 105° C. and equilibrated for 7 days in a controlled humidity room before testing them and pertinent controls by standard TAPPI methods (T–4040S–61) to obtain the data presented in Table I, below, which also sets forth comparisons with handsheet controls including the noncrosslinked satrch ether at several levels of addition and comparison data for handsheets containing the prior art N-methylolacrylamide starch ethers. Also, handsheets of the invention that were slowly dried in air at room temperature instead of in an oven exhibited somewhat lower increases in wet and dry strengths.

EXAMPLE 3

Example 1 was repeated with the exceptions that the "refined" starch carbamoylethyl ether additive from the reaction of 1 mole (162 g.) of starch and 40 g. (0.56 mole) acrylamide and analyzing 2.38 percent N, corresponding to a carbamoylethyl D.S. of 0.316, was crosslinked as previously described and then substituted for the starch ether having a D.S. of 0.433. Handsheets prepared from a furnish containing a 5 percent by weight of dry filter addition of the crosslinked 0.316 D.S. starch ether had a burst value of 81.9, a dry tensile of 12,430, and a wet tensile of 3,790 compared with corresponding values of 62.0, 9,870, and 340 for handsheets made from an identical furnish excepting that the starch ether additive had not been crosslinked.

EXAMPLE 4

Wheat flour, 162 g. dry basis, analyzing 2.44 percent N corresponding to a protein content of 13.9 percent was substituted for the starch reactant of Example 3. The thusly produced "crude" wheat flour carbamoylethyl ether derivative after being crosslinked at pH 2 with 1 ml. of NaOCl solution was added at a level of 5 percent of the dry pulp weight to an unbleached kraft softwood pulp furnish. The resulting handsheets exhibited a burst value of 77.5, dry tensile of 10,950, and a wet tensile of 3,440, whereas handsheets containing the same amount of uncrosslinked additive had a burst strength of 58.0, a dry tensile value of 8,780, and a wet tensile of only 250. Handsheets from the unfortified pulp per se showed a burst value of 45.0, a dry tensile of 7,060, and a wet tensile of 220.

EXAMPLE 5

Example 2 was repeated with the exceptions that a bleached kraft softwood pulp having a freeness of 390 was substituted for the unbleached kraft pulp, and employing the crude, i.e., unwashed, hypochlorite crosslinked starch ether having a carbamoylethyl D.S. of 0.257. The furnish fortified with the crosslinked starch

TABLE I

| Description of furnish | Percent addition of starch ether | NaOCl, ml. | Basis wt., g.s.m. | Burst, g.×cm.²/ g.s.m. | Breaking length, meters | |
|---|---|---|---|---|---|---|
| | | | | | Dry | Wet |
| Pulp control | | | 61.4 | 43.3 | 6,770 | 240 |
| Pulp plus uncrosslinked 0.433 D.S. starch ether [1] | 2 | | 64.3 | 56.6 | 7,810 | 290 |
| Pulp plus crosslinked 0.433 D.S. starch ether [1] | 2 | 0.2 | 61.8 | 73.9 | 11,440 | 3,120 |
| Do [1] | 2 | 0.4 | 61.3 | 75.7 | 11,420 | 3,370 |
| Do [1] | 2 | 0.6 | 62.6 | 75.0 | 10,650 | 3,040 |
| Pulp plus uncrosslinked 0.433 D.S. starch ether [1] | 5 | | 64.4 | 58.4 | 9,110 | 330 |
| Pulp plus crosslinked 0.433 D S. starch ether [1] | 5 | 0.5 | 61.0 | 81.6 | 11,480 | 3,870 |
| Do [1] | 5 | 1.0 | 61.1 | 80.0 | 11,790 | 4,010 |
| Do [1] | 5 | 1.5 | 65.1 | 79.2 | 11,580 | 4,050 |
| Pulp plus uncrosslinked N-methylolacrylamide starch ether; percent N=.05; D.S.=.009 | 5 | | 58.4 | 62.6 | 9,600 | 310 |
| Pulp plus crosslinked N-methylolacrylamide starch ether; percent N=.05; D.S.=.009 | 5 | 1.0 | 60.0 | 63.6 | 9,620 | 860 |
| Pulp plus uncrosslinked N-methylolacrylamidstarch etehr; percent N=1.0; D.S.=.125 | 5 | | 58.6 | 45.6 | 7,940 | 240 |
| Pulp plus crosslinked N-methylolacrylamide starch ether; percent N=1.0; D.S.=.125 | 5 | 1.0 | 59.1 | 49.1 | 8,730 | 500 |

[1] Refined as shown in Table II, the infra nonrefined starch ether additives provide nearly as much strength improvement and probably would be preferred for their somewhat lower cost.

EXAMPLE 2

Using 31 g. (0.43 mole) of acrylamide instead of 60 g. as in Example 1, a crude, i.e., washed carbamoylethyl ether of starch was obtained having a nitrogen content of 1.98 percent, representing a carbamoylethyl, D.S. of 0.257, which value was decreased slightly to a calculated carbamoylethyl D.S. of 0.250 in the "refined" half of the product.

A larger batch of cellulosic pulp identical to that used in Example 1 was prepared, and handsheets were prepared after appropriate portions thereof were fortified by the addition of the above crude or purified starch carbamoylethyl ether per se or the starch ether it had been after being crosslinked with sodium hypochlorite solution at pH 2. The strength values of the handsheets prepared therefrom are given in Table II.

TABLE II

| Description of furnish | Percent addition of above starch ether or comparison agent | NaOCl ml. | Basis wt., g.s.m. | Burst, g.×cm.² g.·.m. | Breaking length, meters | |
|---|---|---|---|---|---|---|
| | | | | | Dry | Wet |
| Pulp control | | | 61.0 | 45.0 | 7,060 | 220 |
| Pulp plus NaCl, control | | 0.4 | 62.8 | 43.3 | 7,065 | 255 |
| Native unmodified starch | 2 | | 63.2 | 53.3 | 7,340 | 189 |
| Do | 2 | 0.4 | 65.5 | 54.5 | 7,890 | 310 |
| Pulp plus uncrosslinked refined [1] starch ether | 2 | | 63.2 | 45.6 | 7,580 | 240 |
| Pulp plus crosslinked refined [1] starch ether | 2 | 0.4 | 61.1 | 78.2 | 11,120 | 3,350 |
| Pulp plus crosslinked crude [2] starch ether | 2 | 0.4 | 58.6 | 78.7 | 11,150 | 2,950 |
| Pulp plus NaOCl, control | | 1.0 | 62.4 | 43.8 | 7,545 | 380 |
| Pulp plus native unmodified starch | 5 | | 64.7 | 58.7 | 8,140 | 216 |
| Pulp plus native unmodified starch plus NaOCl | 5 | 1.0 | 63.5 | 56.7 | 7,990 | 470 |
| Pulp plus uncrosslinked refined [1] starch ether | 5 | | 63.4 | 46.5 | 7,960 | 390 |
| Pulp plus crosslinked refined [1] starch ether | 5 | 1.0 | 65.5 | 83.7 | 12,350 | 3,990 |
| Pulp plus crosslinked crude [2] starch ether | 5 | 1.0 | 57.2 | 76.0 | 11,080 | 3,420 |

[1] Carbamoylethyl D.S. 0.250.
[2] Carbamoylethyl D.S. 0.257.

ether at a 5 percent level of addition provided handsheets that had a burst strength of 71.8, a dry tensile value of 11,210, and a wet tensile of 2,250 compared with values of 60.1, 9,580, and 240 for handsheets from the furnish containing 5 percent of the fiber weight of the noncrosslinked otherwise identical starch ether, also compared with control values of 58.5, 8,980, and 230 for sheets from the unfortified bleached pulp.

We claim:

1. A process for producing kraft papers having a TAPPI wet tensile value of at least 3,000 meters along with materially improved dry tensile and burst strengths comprising dispersing into a papermaker's cellulosic pulp slurry from 2 to 5 percent, based on the dry weight of cellulosic fibers, of a sodium hypochlorite-crosslinked starch carbamoylethyl ether wherein the crosslinking was effected at a pH of about 2, having a carbamoylethyl D.S. of 0.25–0.43, forming a wet web therefrom and oven drying the web to form paper.

References Cited
UNITED STATES PATENTS

| | | | |
|---|---|---|---|
| 3,033,852 | 5/1962 | Paschall | 260—233.3 |
| 3,135,738 | 6/1964 | Cushing | 260—233.3 |
| 3,472,671 | 10/1969 | Wilkinson et al. | 260—233.3 X |

S. LEON BASHORE, Primary Examiner

F. FREI, Assistant Examiner

U.S. Cl. X.R.

260—233.3